Figures 1, 2:
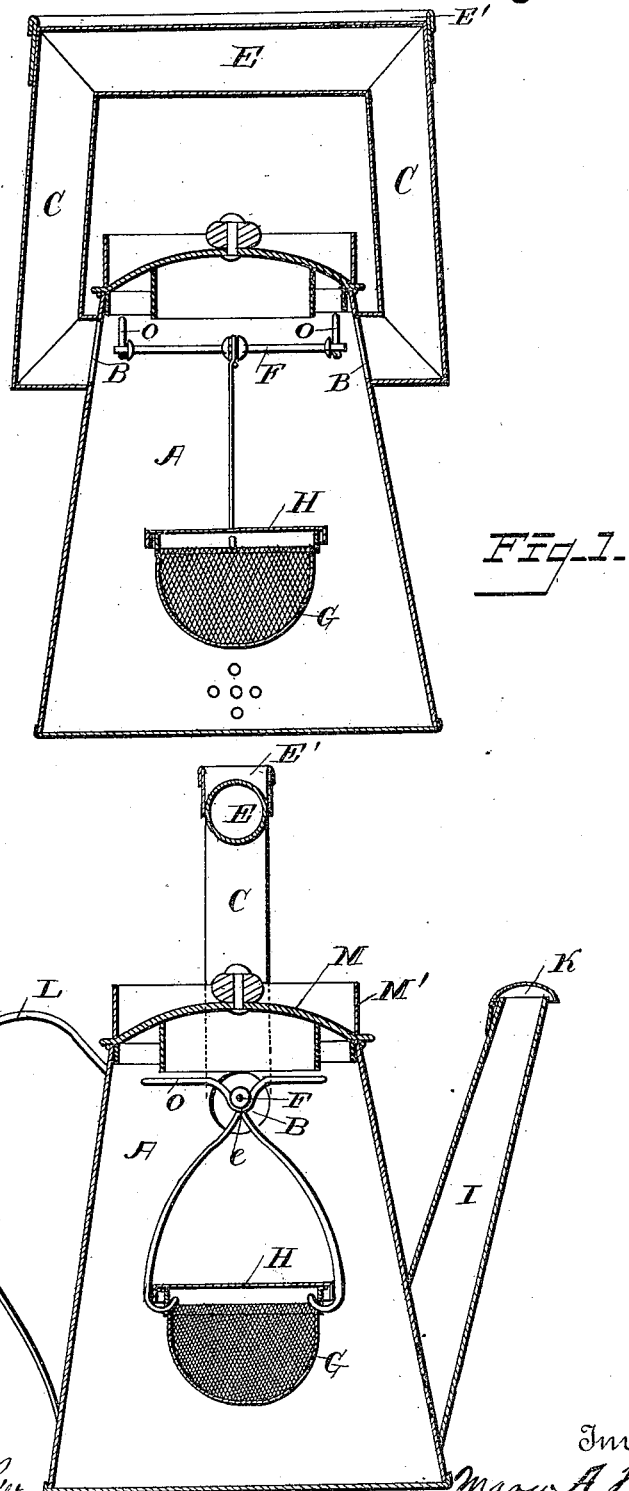

(No Model.)

M. A. HENDERSON.
COFFEE POT.

No. 346,914. Patented Aug. 10, 1886.

Witnesses
James M. Colton
J. W. Garner

Inventor
Mary A. Henderson
By her Attorneys
C. A. Snow & Co.

UNITED STATES PATENT OFFICE.

MARY ADELIA HENDERSON, OF CLINTON, MISSOURI.

COFFEE-POT.

SPECIFICATION forming part of Letters Patent No. 346,914, dated August 10, 1886.

Application filed March 18, 1886. Serial No. 195,708. (No model.)

*To all whom it may concern:*

Be it known that I, MARY ADELIA HENDERSON, a citizen of the United States, residing at Clinton, in the county of Henry and State of Missouri, have invented a new and useful Improvement in Coffee-Pots, of which the following is a specification, reference being had to the accompanying drawings.

My invention is an improvement in coffee-pots; and it consists in the peculiar construction and combination of devices, that will be more fully set forth hereinafter, and particularly pointed out in the claims.

In the drawings, Figure 1 is a vertical sectional view of my invention. Fig. 2 is a similar view of the same, taken on a plane at right angles to Fig. 1.

A represents a coffee-pot, which is provided at its upper end, on opposite sides, with openings B. These openings communicate with hollow pipes C, which extend vertically from the upper end of the coffee-pot and have their upper ends connected by a horizontal pipe, E. Across the openings B, on the inside of the coffee-pot, extend wire bails O, which have central depressions, e, in which rest the outer ends of a transverse wire rod, F, which extends across the upper end of the coffee-pot. From this rod depends a cup, G, which is made of wire-gauze or suitable perforated material, and is provided with a removable cover, H, which is also made of wire-gauze or suitable perforated material.

The coffee-pot is provided with the usual spout, I, having a hinged cap, K, and a handle, L, and the cover M.

The operation of my invention is as follows: The coffee is placed in the perforated cup and suspended in the coffee-pot, and the latter is partly filled with water, so as to submerge the coffee in the cup. The water is then caused to boil. The steam as it arises passes up through the pipes C into the pipe E, and as the said pipes are above the coffee-pot and are surrounded by cool air, the steam is condensed, and the water formed by condensation passes back into the coffee-pot, thus distilling the coffee. When the water has been boiled five or ten minutes, all the strength has been extracted from the coffee, and a beverage of great strength and fine aroma is the result.

A coffee-pot thus constructed is cheap and simple, is not likely to get out of order, retains the strength and aroma of the coffee, and prevents the dregs from mixing with the liquid. When it is desired to clean the coffee-pot, the bar F and the perforated cup are removed, thus affording access to the interior of the coffee-pot, and the cup may be readily cleaned by removing its cover, as will be readily understood.

In order to facilitate the condensation of the steam generated in the coffee-pot, I provide the horizontal pipe E with a vertical upwardly-extending flange, E', which extends entirely around the sides and ends of the said pipe, and forms a receptacle or vessel thereon in which to place cold water. The cover M is also provided with a vertical upwardly-extending annular flange, M', forming a vessel on the top of the cover, for the same purpose.

Having thus described my invention, I claim—

1. The combination of the coffee-pot having the pivotal loops or bails O, the bar secured in the said loops or bails, and the perforated cup or vessel suspended from the said bar, substantially as described.

2. The coffee-pot having the removable cover and the condensing-pipes extending from the upper side of the pot and connected together above the cover, for the purpose set forth, substantially as described.

In testimony that I claim the foregoing as my own I have hereto affixed my signature in presence of two witnesses.

MARY ADELIA HENDERSON

Witnesses:
W. H. COOK,
B. C. SIMES.